United States Patent
Floris van Beek van Leeuwen et al.

(10) Patent No.: US 10,318,334 B2
(45) Date of Patent: Jun. 11, 2019

(54) VIRTIO RELAY

(71) Applicants: Gysbert Floris van Beek van Leeuwen, Herolds Bay (ZA); Johann Heinrich Tönsing, Santa Clara, CA (US)

(72) Inventors: Gysbert Floris van Beek van Leeuwen, Herolds Bay (ZA); Johann Heinrich Tönsing, Santa Clara, CA (US)

(73) Assignee: Netronome Systems, Inc., Santa Clara, CA (US)

( * ) Notice: Subject to any disclaimer, the term of this patent is extended or adjusted under 35 U.S.C. 154(b) by 0 days.

(21) Appl. No.: 15/644,636

(22) Filed: Jul. 7, 2017

(65) Prior Publication Data

US 2019/0012193 A1    Jan. 10, 2019

(51) Int. Cl.
*G06F 13/28* (2006.01)
*G06F 13/40* (2006.01)
*G06F 13/42* (2006.01)
*G06F 9/455* (2018.01)

(52) U.S. Cl.
CPC .......... *G06F 9/45558* (2013.01); *G06F 13/28* (2013.01); *G06F 13/4022* (2013.01); *G06F 13/4282* (2013.01); *G06F 2009/45579* (2013.01); *G06F 2009/45595* (2013.01); *G06F 2213/0026* (2013.01)

(58) Field of Classification Search
CPC ....... G06F 9/45558; G06F 2009/45579; G06F 2009/45595; G06F 13/28; G06F 13/4022; G06F 13/4282; G06F 2213/0026
See application file for complete search history.

(56) References Cited

U.S. PATENT DOCUMENTS 9,237,095 B2    1/2016  Stark et al. ............. H04L 45/50
9,755,910 B1 *  9/2017  Tonsing .................. H04L 41/12
(Continued)

OTHER PUBLICATIONS

"OpenFlow Switch Specification", version 1.5.1, available from the Open Networking Foundation at www.opennetworking.org, 283 pages (Mar. 26, 2015).

(Continued)

*Primary Examiner* — Glenn A. Auve
(74) *Attorney, Agent, or Firm* — Imperium Patent Works LLP; T. Lester Wallace

(57) ABSTRACT

A VIRTIO Relay Program allows packets to be transferred from a Network Interface Device (NID), across a PCIe bus to a host, and to a virtual machine executing on the host. Rather than an OvS switch subsystem of the host making packet switching decisions, switching rules are transferred to the NID and the NID makes packet switching decisions. Transfer of a packet from the NID to the host occurs across an SR-IOV compliant PCIe virtual function and into host memory. Transfer from that memory and into memory space of the virtual machine is a VIRTIO transfer. This relaying of the packet occurs in no more than two read/write transfers without the host making any packet steering decision based on any packet header. Packet counts/statistics for the switched flow are maintained by the OvS switch subsystem just as if it were the subsystem that had performed the packet switching.

21 Claims, 2 Drawing Sheets

(56) References Cited

U.S. PATENT DOCUMENTS

| | | | | |
|---|---|---|---|---|
| 2014/0229769 | A1* | 8/2014 | Abraham | G06F 13/102 |
| | | | | 714/43 |
| 2015/0220449 | A1 | 8/2015 | Stark | 711/206 |
| 2017/0163538 | A1* | 6/2017 | Feng | H04L 45/24 |
| 2017/0235510 | A1* | 8/2017 | Hu | G06F 12/02 |
| | | | | 710/308 |
| 2017/0322828 | A1* | 11/2017 | Panicker | G06F 9/45558 |
| 2018/0123880 | A1* | 5/2018 | Wen | G06F 9/45558 |
| 2018/0254981 | A1* | 9/2018 | Babu | H04L 45/26 |

OTHER PUBLICATIONS

"Single-Root I/O Virtualization and Sharing Specification", Revision 1.1, available from the Peripheral Component Interconnect Special Interest Group (PCI-SIG) association at www.pcisig.com, 100 pages (Jan. 20, 2010).
"Virtual I/O Device (VIRTIO) Specification", version 1.0, available from www.oasis-open.org, 69 pages (Dec. 3, 2013).
"Virtio: Towards a De-Facto Standard for Virtual I/O Devices", by Rusty Russell, IBM OzLabs, published in ACM SIGOPS Operating Systems Review, vol. 42, Issue 5, pp. 95-103 (Jul. 2008).
"Open vSwitch", three web pages of Wikipedia (Printed Jan. 25, 2017).
Virtio PCI Card Specification, version 0.9.5 DRAFT, by Rusty Russell, IBM Corporation, 62 pages (May 7, 2012).
"OVS Offload with Intel FM10000", DPDK Summit presentation, 31 pages (Aug. 2016).
"DPDK Data Plane Development Kit", http://dpdk.org, 12 selected pages (Jul. 6, 2017).
"Open vSwitch with DPDK Overview", Intel Corporation, https://software.intel.com, 10 pages (Jul. 6, 2017).

* cited by examiner

PCIe VF-TO-VIRTIO DEVICE
RELAY WITH NO PACKET
SWITCHING ON THE HOST

OPERATION OF THE VIRTIO
RELAY PROGRAM

VIRTIO RELAY

TECHNICAL FIELD

The described embodiments relate generally to systems and methods for the transfer of packets back and forth between Network Interface Devices (NIDs) and Virtual Machines (VMs).

REFERENCE TO ASCII TEXT FILE APPENDIX

This application includes an ASCII text file appendix containing source code that embodies the inventions described herein. A portion of the disclosure of this patent document contains material that is subject to copyright protection. All the material in the ASCII text file appendix is hereby expressly incorporated by reference into the present application. The copyright owner of that material has no objection to the facsimile reproduction by anyone of the patent document or the patent disclosure (to the extent that the copyright is owned by the current assignee of this patent document), as it appears in the Patent and Trademark Office patent files or records, but otherwise reserves all copyright rights. The ASCII text file appendix includes the following text files that are readable in the MS-Windows operating system: 1) the file named "VIRTIO_Relay_Program.txt", is 356 KB large, created May 5, 2017; 2) the file named "Offload_Driver.txt", is 296 KB large, created May 5, 2017; 3) the file named "Control_Message_Driver.txt", is 32 KB large, created May 5, 2017; and 4) the file named "Fallback_and VF_netdev_Drivers.txt", is 112 KB large, created May 5, 2017.

BACKGROUND INFORMATION

In one type of network-connected network device, a plurality of Virtual Machines (VMs) is running on a host computer. The network-connected network device may, for example, be a web hosting server that implements multiple virtual web servers. A Network Interface Card (NIC) is coupled to the host computer via a Peripheral Component Interconnect Express (PCIe) bus. From the perspective of one of the virtual machines, the virtual machine appears to have its own NIC interface to the network when in reality all the hosted virtual machines share use of the same one NIC interface. In one example, a packet is received from the network and onto the NIC. This packet is destined for a particular one of the virtual machines. The packet is received onto the NIC, and is passed across the PCIe bus via a PCIe virtual function to the host computer. The host computer analyzes the packet. Based on this analysis and/or switching rules and/or flow tables, the processor of the host computer then writes the packet into memory space of the appropriate one of the virtual machines. Packet traffic can also pass in the opposite direction. A packet originating from a virtual machine is analyzed by the processor of the host. Based on this analysis and/or switching rules and/or flow tables, the packet is transferred via the appropriate PCIe virtual function, across the PCIe bus, to the NIC, and out of the NIC to the network. Various standards and mechanisms exist for implementing this general functionality.

SUMMARY

A system involves a Network Interface Device (NID) that is coupled to the host computer via a PCIe bus. Executing on the host computer is an operating system (for example, Linux) and a plurality of Virtual Machines (VMs). A first novel method involving this system comprises: (a) Executing an Open Virtual Switch (OvS) switch subsystem on the host computer. At least part of the OvS switch subsystem executes in user space. (b) Executing a "PCIe VF-to-VIRTIO device Relay Program" (Relay Program) in user space on the host computer. (c) Supplying "PCIe virtual function to Virtual I/O (VIRTIO) device mapping information" (Mapping Information) from the OvS switch subsystem to the Relay Program. In one example, this Mapping Information is an implicit one-to-one mapping and correspondence between each respective one of the PCIe virtual functions and a corresponding one of the VIRTIO devices. (d) Communicating switching rule information from the OvS switch subsystem to the NID via the PCIe bus. (e) Receiving a packet onto the NID from a network. This packet has not been received onto the host computer, but rather is destined for a virtual machine on the host computer. (f) Based at least in part on packet contents (for example, packet headers) of the packet and the switching rule information, deciding on the NID to communicate the packet across the PCIe bus via a selected one of a plurality of "Single Root I/O Virtualization" (SR-IOV) compliant PCIe virtual functions. (g) Communicating the packet from the NID and across the selected one of the plurality of SR-IOV compliant PCIe virtual functions to the host computer such that the packet is written into user space memory of an instance of a user mode driver of the Relay Program. (h) Using the Mapping Information on the Relay Program to cause the packet to be transferred from the user space memory of the instance of the user mode driver of the Relay Program to memory space of one of the virtual machines. The packet is communicated in (g) and is transferred in (h) without the operating system of the host computer making any steering decision for the packet based on packet contents (for example, packet headers) at any time between the time the packet is received onto the NID in (e) and the time the transfer of the packet in (h) is completed. The host computer does not inspect or analyze any packets headers of the packet, but nonetheless the packet is deposited into the memory space of the correct virtual machine.

The packet is communicated in (g) and (h) from the NID and to the memory space of the virtual machine in two and no more than two read/write operations. The first read/write transfer operation is caused by a Direct Memory Access (DMA) controller of the NID. This single read/write transfer operation results in the packet being written into the user space memory of an instance of a user mode driver of the Relay Program. The second read/write transfer operation is performed by the host computer. This single read/write transfer operation results the packet being written into the memory space of the virtual machine. Each byte of the packet is read and written twice and no more than two times.

In a second novel method involving the system, the flow of packets is in the opposite direction from memory spaces of the virtual machines, through the NID, and out of the NID to the network. A packet originating in a virtual machine is transferred in a first read/write transfer operation from the memory space of that virtual machine into another memory space on the host computer, and is then transferred in a second read/write transfer operation under the control of the DMA controller of the NID from that memory space on the host computer and across the PCIe bus and into the NID. Once on the NID, the packet is communicated out of the NID and onto the network. The Relay Program relays the packet and makes sure it passes to the NID via the appropriate one of the PCIe virtual functions that is associated with the virtual machine from which the packet originated.

The Relay Program does this without the host computer making any steering decision for the packet based on packet contents at any time between the time the packet transfer from the virtual machine starts until the transfer of the packet out onto the network is completed. The Relay Program uses the same Mapping Information it used in the first novel method as described above. As explained above in connection with the first novel method, the Relay Program obtains the Mapping Information from the OvS switch subsystem on the host computer.

The OvS switch subsystem maintains switching rules and flow tables. These switching rules and flow tables define how matching packets and flows of packets are to be handled. From the perspective of the OvS switch subsystem, it believes that it is handling the switching of all packets. Each transferred packet that meets a switching rule is to be counted and other statistics about the flow are to be updated. The OvS switch subsystem is to maintain these statistics about each different switched flow. The packet switching decisions carried out by the NID are, however, unknown to the OvS switch subsystem. For example, for a packet passing from the NID to a virtual machine in accordance with the first novel method, the packet switching decision is actually carried out by the NID and not by the host computer. The packet does not flow through the network stack of the host computer in such a way that it could be counted by the host computer. The packet switching decision carried out by the NID determines the PCIe virtual function via which the packet will be communicated from the NID and to the host computer. In accordance with one novel aspect, when the NID makes a packet switching decision and causes the associated packet transfer to occur, the NID keeps incremental packet count and statistics information. The NID then causes the cumulative packet count and statistics values in the OvS switch subsystem to be updated so that these statistics as maintained on the host computer will be accurate just as if all packets had been actually handled and switched by the OvS switch subsystem.

Further details and embodiments and methods and techniques are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to background examples and some embodiments of the invention, examples of which are illustrated in the accompanying drawings.

Figure 1:
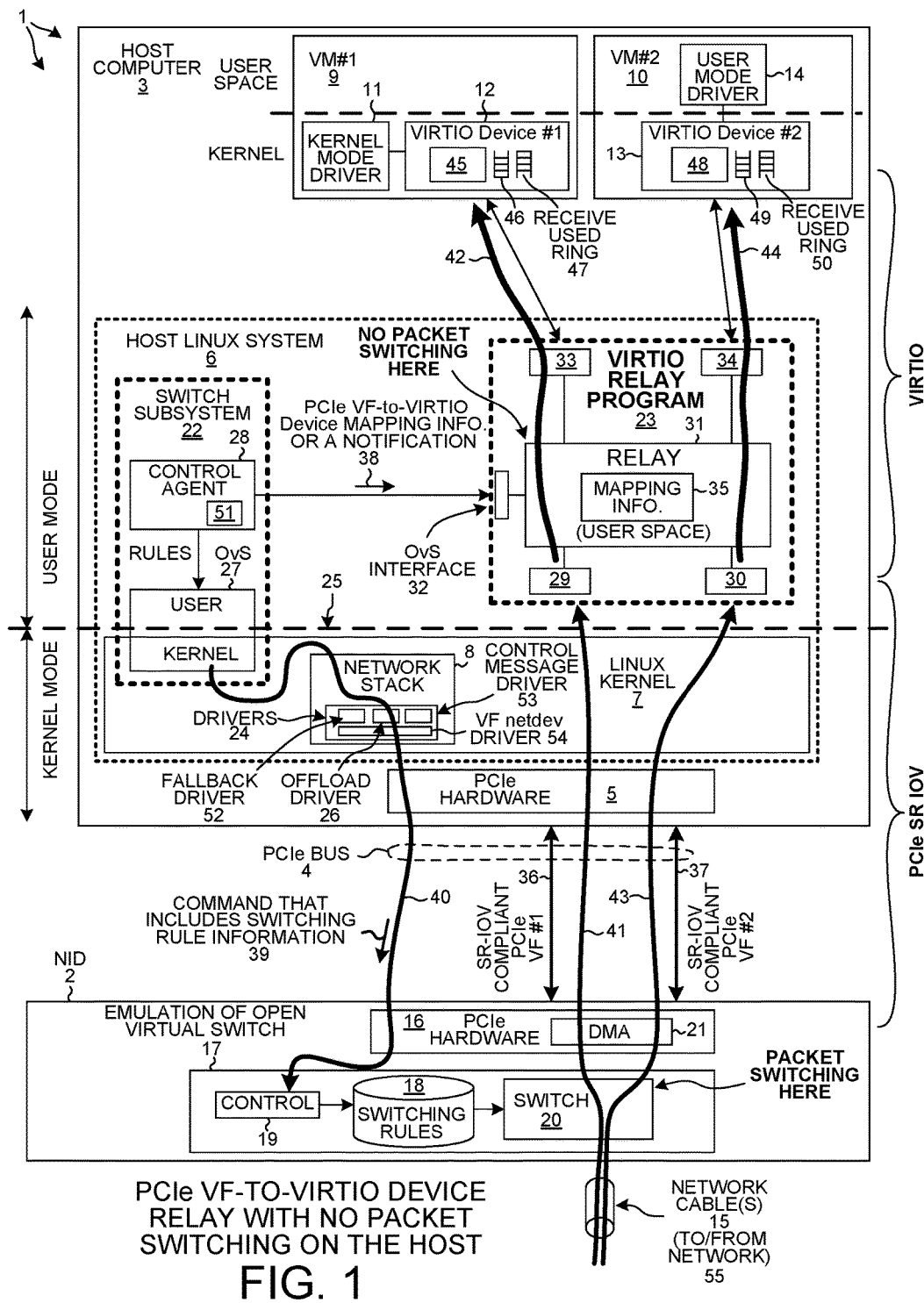
FIG. 1 is a diagram of a system that includes a novel VIRTIO Relay Program in accordance with one novel aspect.

FIG. 1 is a diagram of a system 1 in accordance with one novel aspect. The system 1 includes a Network Interface Device (NIC) 2 and a host computer 3. NID 2 is coupled to host computer 3 via a Peripheral Component Interconnect Express (PCIe) bus 4, which in this case is an 8-lane PCIe bus. The PCIe bus 4 is compliant with the PCIe 3.1 specification as adopted and maintained on www.pcisig.com by the PCI-SIG (Special Interest Group) standards body and membership group. NID 2 in this case is a Network Interface Card, commonly referred to as a "NIC". Host computer 3 in this case is a common server for networking applications that includes, among other parts, a Central Processing Unit (CPU) (not illustrated), an amount of memory (not illustrated), and PCIe hardware 5. The memory is a non-transitory computer-readable medium that is readable by the CPU. The host computer 3 may, for example, be a PowerEdge T630 tower server available from Dell Inc., One Dell Way, Round Rock, Tex. 78682 that has an Intel Xeon E5-2620 CPU.

Running on the host computer 3 is a host Linux system 6. System 6 includes a number of user space programs and a Linux operating system kernel 7. The main network stack 8 of the host computer is part of the kernel 7. The hypervisor (not shown) of the host computer 3 handles two Virtual Machines (VMs) 9 and 10. VM 9 has user space code and programs as well as kernel space code and programs. Two of the kernel space code and programs include a kernel mode driver 11 and a VIRTIO device 12. The VIRTIO device 12 is referred to as "VIRTIO Device #1". VM 10 also has user space code and programs and kernel space code and programs. A VIRTIO device 13 in kernel space communicates with a user mode driver 14 in user space. The VIRTIO device 13 is referred to as "VIRTIO Device #2". Each of the VIRTIO devices 12 and 13 is a VIRTIO device as described and explained in the following VIRTIO specification available from www.oasis-open.org: Virtual I/O Device (VIRTIO) Version 1.0 (Dec. 3, 2013). All the software and programs of the host computer that are mentioned here are stored in memory (the non-transitory computer-readable medium) on the host computer.

NID 2 includes, among other parts, a plurality of physical network interface ports, a physical layer interface circuit (PHY), an Island-Based Network Flow Processor Integrated Circuit (IB-NFP), and associated memory integrated circuits. The NID 2 plugs into, or couples to, a motherboard upon which the circuitry of the host computer 3 is realized. For additional information on the NID 2 and on the IB-NFP, see: 1) U.S. patent application Ser. No. 13/399,888, entitled "Island-Based Network Flow Processor Integrated Circuit", filed Feb. 17, 2012, by Gavin J. Stark, and 2) U.S. patent application Ser. No. 14/923,457, entitled "Maintaining Bypass Packet Count Values", filed Oct. 27, 2015, by Johann H. Tönsing (the subject matter of these two patent applications is incorporated herein by reference).

Within the IB-NFP integrated circuit (referred to here as the "NFP") are a plurality of SerDes circuits, a PCIe island, an ingress MAC island, an ingress NBI island, a plurality of ME cluster islands, a plurality of memory unit islands, an egress NBI island, an egress MAC island. As explained in the two patent applications referenced above, network packets are received from an external network or networks 55 onto the NFP. The network packets enter the NFP integrated circuit via SerDes circuits. The packets pass from the SerDes circuits, through the ingress MAC island, and then through the ingress NBI island. The packets are then stored either on the NFP in SRAM or on a combination of the NFP and external memory. The packets are analyzed by circuitry of the ME cluster islands. Packets can also be received on the NFP from the PCIe bus 4 via other SerDes circuits. Micro-Engine (ME) processors and transactional memory circuits and other circuitry in the ME clusters perform lookups and other processing on the packets. Based on the result of these lookups and processing, a packet can be output to the host computer from the NFP via the PCIe bus 4. A packet can also be output to the external network 15 from the NFP via egress NBI island, the egress MAC island, and other SerDes circuits. In this way, the NFP may receive a packet from one of a plurality of input ports, may analyze the packet and make a switching decision based on the contents of the packet, and then output the packet from the NFP via a selected one of a plurality of output ports. More particularly, NID 2 and the NFP emulate an Open Virtual Switch.

In the illustration of FIG. 1, block 16 represents the PCIe island and hardware associated with interfacing the NFP to the PCIe bus. The PCIe block 16 includes a DMA controller 21. This DMA controller 21 can read data from the NID 2, and cause this data to be transferred across the PCIe bus 4, and to be written into memory in the host computer 3. The DMA controller 21 can also read data from memory in the host computer 3, and cause this data to be transferred across the PCIe bus 4, and to be written into the NID 2. For additional information on block 16 and the circuitry of the PCIe island within the NFP, see: U.S. patent application Ser. No. 14/172,844, entitled "Network Interface Device That Maps Host Bus Writes Of Configuration Information For Virtual NIDs Into A Small Transactional Memory", filed Feb. 4, 2014, United States Patent Publication US20150220449, by Gavin J. Stark (the subject matter of which is incorporated herein by reference).

Block 17 represents the remainder of the NFP hardware that functions as an Open Virtual Switch (OvS) compliant virtual multilayer network switch. In the system 1 of FIG. 1, network packets flow in both directions through the NID, namely packets are received from the network or networks 15 and pass through the NID and are passed to the host computer 3. Packets also flow in the opposite direction from the host computer 3, through the NID and out to the network or networks 15. Still other packets are received from the network or networks 15 onto the NID, and a switched on the NID, and are output back out to the network or networks 15 without ever passing to the host computer 3. For ease of explanation, only the direction of flow from the network or networks 15, through the NID 2, across the PCIe bus 4, and to the host computer 3 is illustrated in FIG. 1. More particularly, tables of packet switching rules 18 are stored on the NID 2. A packet is received from the network or networks 15 on the NID 2. In accordance with the OpenFlow specification, as implemented in OvS, various fields of the packet such as, for example, the contents of various headers of the packet, are then compared to rules in the flow tables. A rule typically sets forth characteristics of a flow of packets or a group of flows of packets. If the packet is determined to match a particular rule, then the rule generally specifies an action that the NID 2 is to take. The action may, for example, be to output the packet from the NID 2 via a particular output port. For additional information on packet switching carried out by NID 2, see: 1) OpenFlow Switch Specification, Version 1.5.0 (Dec. 19, 2014), from the Open Networking Foundation, www.opennetworking.org, and 2) U.S. patent application Ser. No. 14/923,457, entitled "Maintaining Bypass Packet Count Values", filed Oct. 27, 2015, by Johann H. Tönsing (the subject matter of this patent application is incorporated herein by reference).

The NFP is programmed to be able to receive commands via the PCIe bus 4. One example of a command is a command to add information into a particular flow table to implement an OvS rule. Another example of a command is a command to delete that information. The arrow 39 in FIG. 1 represents one such command. The block 19 labeled control receives such commands and then in accordance with the command configures the hardware of the NFP so as to implement the indicated rule change. To implement a rule, the control block 19 typically causes a transactional memory in the NFP to be loaded with match and action information. Block 20 labeled switch represents the remainder of the hardware of the NFP that applies rules to packets, and that carries out indicated actions such as outputting the packet from the NFP via a selected one of a plurality of output ports.

Software executing on the host computer 3 includes a Switch subsystem 22 and a novel VIRTIO Relay program 23. Part of the Switch subsystem 22 executes in user space and another part of the Switch subsystem 22 operates in kernel space. In FIG. 1, blocks of program code illustrated to be below horizontal dashed line 25 generally execute in kernel space, whereas blocks of program code illustrated to be above horizontal dashed line 25 generally execute in user space. The Switch subsystem 22 includes an OvS portion 27 and a control agent portion 28. In addition to the Switch subsystem 22 and the VIRTIO Relay program 23, there is also a novel set of drivers 24. These novel drivers 24 have been added to the main network stack 8 of the Linux operating system. These novel drivers 24 include the so-called "offload driver" 26, the fallback driver 52, the control message driver 53, and the VF netdev driver 54.

The VIRTIO Relay program 23 executes in user space. The VIRTIO Relay program 23 includes a first user mode driver instance 29 (also called a "Poll Mode Driver" or a "PMD"), a second user mode driver instance 30, a central relay portion 31, an OvS interface 32, a first Vhost-user interface instance 33, and a second Vhost-user interface instance 34. The first user mode driver instance 29 is associated with SR-IOV compliant PCIe virtual function #1. The SR-IOV compliant PCIe virtual function #1 is represented by arrow 36. The second user mode driver instance 30 is associated with SR-IOV compliant PCIe virtual function #2. The SR-IOV compliant PCIe virtual function #2 is represented by arrow 37. Vhost-user interface instance 33 is an amount of code usable to set up communication with the "VIRTIO Device #1" 12. Likewise, Vhost-user interface instance 34 is an amount of code usable to set up communication with the "VIRTIO Device #2" 13.

The VIRTIO Relay program 23 maintains and stores mapping information 35. It does not, however, store or maintain or apply any packet switching rules. In the illustrated example, mapping information 35 includes: 1) a first mapping between "SR-IOV compliant PCIe virtual function #1" and "VIRTIO Device #1", and 2) a second mapping between "SR-IOV compliant PCIe virtual function #2" and "VIRTIO Device #2". For additional information on SR-IOV, and what an SR-IOV compliant PCIe virtual function is, see the following SR-IOV specification: Single-Root I/O Virtualization and Sharing Specification, Revision 1.1, Jan. 20, 2010, available from the Peripheral Component Interconnect Special Interest Group (PCI-SIG) association at www.pcisig.com.

As is explained in further detail below, a packet can be DMA-transferred in accordance with the SR-IOV specification in a single logical read/write operation by the DMA controller 21 of the NID 2 into memory of the host computer 3 via the first PCIe virtual function #1. If there is such data received onto the host computer 3 via the first PCIe virtual function #1, then the VIRTIO Relay program 23 detects that it was received via the first PCIe virtual function #1 and causes it to be read from the memory space where it was written (by the DMA controller 21) and to be written into memory space of the VIRTIO Device #1 in accordance with the mapping information 35. This is a simple reading of the data of the packet from one memory area in host memory and the writing of the data into another memory area in host memory. This transfer occurs without the CPU of the host computer 3 performing any packet switching or matching of packet fields to rules. Contents of the packet such as packet headers are not used to determine whether the packet should be relayed to VIRTIO device #1 or to VIRTIO device #2. The packet is therefore transferred from the NID 2 into memory space of the first virtual machine VM#1 in two and only two read/write operations. The first read/write operation is carried out by the DMA controller 21. The second read write operation is carried out by the CPU of the host computer 3. Importantly, the Openflow and OvS-compliant packet switching decision and application of packet switching rules is not made on the host computer 3 but rather is made by the NID 2.

Likewise, a packet can be DMA-transferred in accordance with the SR-IOV specification by the DMA controller 21 of the NID 2 into memory of the host computer 3 via the second PCIe virtual function #2. If there is such data received onto the host computer 3 via the second PCIe virtual function #2, then the VIRTIO Relay program 23 detects that it was received via the second PCIe virtual function #2 and causes it to be read from the memory space where it was written (by the DMA controller 21) and to be written into memory space of the VIRTIO Device #2 in accordance with the mapping information 35. This is a simple reading of the data of the packet from one memory area in host memory and the writing of the data into another memory area in host memory. This transfer occurs without the CPU of the host computer 3 performing any packet switching or matching of packet fields to rules. Contents of the packet such as packet headers are not used to determine whether the packet should be relayed to VIRTIO device #1 or to VIRTIO device #2. The packet is therefore transferred from the NID 2 into memory space of the second virtual machine VM#2 in two and only two read/write operations. The first read/write operation is carried out by the DMA controller 21. The second read write operation is carried out by the CPU of the host computer 3. Importantly, the OvS-compliant packet switching decision and application of packet switching rules is not made on the host computer 3 but rather is made by the NID 2.

Operation of the VIRTIO Relay Program Operation in More Detail:

According to the SR-IOV specification, when a guest device (like NID 2) is plugged into a PCIe bus of a host computer, it must provide a "capability structure" that the host computer can read. This "capability structure" says how many PCIe virtual functions there are, and what the BAR (Base Address Register) is for reading from and writing to the each virtual function. This mechanism is used by the Switch subsystem 22 to learn about the PCIe virtual functions being provided by NID 2. The VIRTIO Relay program 23 learns about these PCIe virtual functions using a part of the OvS control agent 28 referred to as the OvS DB 51. The OvS DB 51 has a facility to which other programs can subscribe, so that they will be informed when particular changes to the database are made. The VIRTIO Relay program 23 subscribes to the OvS DB 51 in this way to receive a notification 38 if a "port" is added or if a "port" is removed. Notification 38 about a port includes information indicating whether communication for the port should be relayed to/from virtual machines by the VIRTIO Relay program 23. If through this notification mechanism the VIRTIO relay program 23 detects a port being added that it determines it should handle, then the VIRTIO relay program 23 fetches additional information about the port including which VF is to be associated with the port. More particularly, the "OvS DB notification" 38 indicates a "NET device". The VIRTIO Relay program 23 can then query the kernel network stack 8 for the additional information using a tool called "ETHTOOL". Within the network stack 8, information about the NET device is known to the callback driver 52. OvS does not deal directly with virtual functions, but rather it deals with "NET devices". A "NET device" in Linux is a structure that is a general indication of a port, but the port can be a PCIe virtual function or can be another kind of port. In the case of the system of FIG. 1, the "NET device" represents a virtual function. By this query, the VIRTIO Relay program 23 receives information about the underlying PCIe virtual function, including: a number of the PCIe virtual function (the "VF number"), the PCIe address of the VF, the addresses of memory buffers for that VF, packet statistics pertaining to the VF, and link state of the VF. Virtual functions are numbered, from 0 to 59: VF "ID 0". VF "ID 1", and so forth.

The first and second user mode driver instances 29 and 30 are poll mode drivers written specifically for the NID 2. They were written by extending a toolkit referred to as the DPDK (Data Plane Development Kit). The DPDK is a set of functions and drivers that can be incorporated into, and made a part of, other user mode programs. VIRTIO Relay program 23 is an example of one such a user mode program. Functions of the DPDK abstract a PCIe virtual function, so from the VIRTIO Relay program's perspective, it does not deal with a VF directly. For example, to output data to NID 2 via a PCIe virtual function, the VIRTIO Relay program 23 calls a transmit function of the DPDK toolkit. The transmit function causes a particular packet to be output from an indicated "interface", where the indicated "interface" may be the "user mode driver instance" 29 associated with PCIe virtual function #1, or where the indicated "interface" may be the "user mode driver instance" 30 associated with PCIe virtual function #2. Likewise, the DPDK toolkit includes a receive function usable to receive data from an "interface", where the "interface is a "user mode driver instance" 29 associated with PCIe virtual function #1, or where the "interface" is the "user mode driver instance" 30 associated with PCIe virtual function #2. Once data has been received by the main program code of the VIRTIO Relay program using the appropriate DPDK function, the main program code can use then manipulate and process use that information in any way desired. The main VIRTIO Relay program code, along with the code of any DPDK functions employed by the main program, are linked together and compiled to form a single amount of executable code.

More particularly, communication between the VIRTIO relay program 23 and the NID 2 involves a number of memory buffers. A memory buffer is an amount of memory on the host computer. The memory buffer is identified by a buffer descriptor. In addition to the memory buffers, the communication with the NID 2 involves a set of queues. For each PCIe virtual function, there is a "free list" queue of buffer descriptors for communication in the direction from the NID 2 to the host computer, and there is a "receive queue" of buffer descriptors. There is also a "free list" queue of buffer descriptors for communication in the opposite direction from the host computer to the NID 2, and there is a "transmit queue" of buffer descriptors.

For a communication in the direction from NID 2 to the host computer 3 as illustrated in FIG. 1 across PCIe virtual function #1, the NID 2 reads a buffer descriptor off the "free list" queue for the receive queue maintained by "user mode driver" 29. The DMA controller 21 uses the address information in the buffer descriptor to determine the host memory addresses of the associated memory buffer where the packet can be deposited. There might be address translation that is done in hardware on the host computer so that the NID card thinks it is writing into one place, but the destination address is translated so that the data is actually written into another place. Regardless of whether there is address translation or not, there is one read of the data from the NID 2 and one write of the data into the member buffer on host computer 3. After the DMA controller 21 has written the data into the memory buffer, it pushes the buffer descriptor onto the "receive queue" of the "user mode driver #1" for virtual function #1. By use of a DPDK function, the VIRTIO relay program 23 then learns of the buffer descriptor on the receive queue of the "user mode driver #1, and reads the buffer descriptor from that queue, and uses the buffer descriptor to read the data from the memory buffer. As part of the operation of the receive function, the buffer descriptor is then put onto the free list queue again.

The VIRTIO Relay program 23 learns about the "Vhost-user interface instances" 33 and 34 from the hypervisor in the Linux operating system, using the DPDK provided functions. The hypervisor knows about all virtual machines running on the host computer. The VIRTIO Relay program 23 calls a function of the "Vhost-user interface" to declare the Vhost-user interface instance and to register a call back function with the Vhost-user interface instance. Once the Vhost-user interface instance has been declared in this way, the VIRTIO Relay program 23 can "call a function on the instance". As a result of the first call, the Vhost-user interface instance calls the VIRTIO Relay program 23 back (a so-called "callback function"). The call back function happens automatically from the perspective of the VIRTIO relay program 23, and this call back gives a "handle" to the VIRTIO Relay program 23. The VIRTIO Relay program 23 uses this handle to make a second call to the Vhost-user interface instance. The second call causes the Vhost-user interface instance to give back to the VIRTIO Relay program 23 certain information (including memory addresses in the associated virtual machine where data can be read and written, and information about queues usable to interface with the virtual machine). The "Vhost-user interface instance" knows this information about the VM by virtue of its communication with the hypervisor. In this way, for each virtual machine, the VIRTIO Relay program 23 obtains information indicating: 1) the number of the "VM device", 2) which VM guest memory addresses correspond (map) to which host memory addresses, and 3) the identification of queues of descriptors that are usable to communicate with the VM device. Once the connection to the VM has been set up in this way, there can be data communication between the VIRTIO Relay program 23 and the VM. The VM enqueues descriptors of free buffers on a free list queue. For data going from the VIRTIO Relay program to a VM, the VIRTIO Relay program gets a descriptor from this free list queue (the descriptor is actually indirect, an index into a table, and the table gives the address where the packet will go). As a result of the indirect lookup, the address is obtained. The main part of the VIRTIO Relay program (a C code program) calls a "VIRTIO send API" function of the DPDK toolkit. This call causes data to be copied from one address to the other address, and as a result the data is read and written by the host CPU. After the data has been moved, the descriptor for the now filled member buffer is re-enqueued onto a queue (also called a "ring") of the VM. This queue is the used "receive" queue of the VM. The re-enqueued descriptor indicates to the VM that there is data in the corresponding memory buffer for the VM to receive. The "VIRTIO send API" function call causes the transfer of data to occur, and also causes the buffer descriptor to be loaded onto the used receive queue. The virtual machine can then read the buffer descriptor from the used receive queue, and learn the address of the memory buffer in virtual machine memory space that contains the data. The virtual machine can then read the data from the indicated memory buffer.

A "Vhost-user interface instance" only exchanges control information between the VIRTIO Relay program and the hypervisor to set up the connection into, and out of, a virtual machine. The information provided to the VIRTIO Relay program indicates: 1) where inside VM the packet buffer memory is, and 2) where the queues (of buffer descriptors) are for a particular VM. The particular VM is identified by its VIRTIO ID number). There are actually four queues (called "rings"). A free list queue (also called an "available" ring) and an associated "receive" queue (also called a "used" ring), and a second free list queue (also called an "available" ring) and an associated "transmit" queue (also called a "used" ring). In VIRTIO terminology, the broader term receive "Virtqueue" refers to the available ring, the used ring, and the associated "descriptor table" for communication in one direction). Once the connection is set up, the "Vhost-user interface instance" is not used, but rather data is transferred directly into, or out of, the appropriate memory buffers without any involvement of the Vhost-user interface instance. The Vhost-user interface instance is not involved in actual data transfer.

In FIG. 1, reference numeral 45 represents memory buffers of a Virtqueue of the VIRTIO device #1. Reference numeral 46 represents the associated free list queue, and reference numeral 47 represents the associated receive queue. Likewise, reference numeral 48 represents memory buffers of a Virtqueue of the VIRTIO device #2. Reference numeral 49 represents the associated free list queue, and reference numeral 50 represents the associated receive queue.

Implicit Mapping: In the particular embodiment of FIG. 1, the first user mode driver instance 29 can only be mapped to the first VIRTIO device 12. Likewise, the second user mode driver instance 30 can only be mapped to the second VIRTIO device 13. Each of the user mode driver instances has a number. First user mode driver instance 29 has an instance number 1. Second user mode driver instance 30 has an instance number 2. Similarly, each VIRTIO device has a number. VIRTIO device 12 has a VIRTIO device number of 1. VIRTIO device 13 has a VIRTIO device number of 2. If a user mode device driver is to be mapped, then it is mapped to a VIRTIO device of the same number. This is called "implicit one-to-one mapping". When the VIRTIO Relay program 23 receives an "OvS DB notification" and it learns of an virtual function number by the process described above, then this establishes a mapping from the user mode driver having that instance number to the VIRTIO device having that instance number. In the example of FIG. 1, the VIRTIO Relay program 23 has received notifications of two added ports, so there are two mappings: user mode driver instance #1 29 is mapped to VIRTIO device #1 12, and user mode driver instance #2 30 is mapped to VIRTIO device #2 13.

The offload driver 26 interfaces with the Switch subsystem 22 and obtains information about packet switching rules installed in the Switch subsystem 22. To do this, the offload driver 26 registers a "call back function" with Switch subsystem 22. The Switch subsystem 22 calls the offload driver 24 back whenever a new rule is added into the Switch subsystem 22, or is deleted from the Switch subsystem 22.

This results in the offload driver 24 getting all specifics of each rule such as what action needs to be taken if there is a match to the rule. Offload driver 26 knows whether the NID 2 can carry out a particular action. Rules whose actions cannot be carried out on the NID 2 are ignored by the offload driver 26 so the Switch subsystem 22 carries on as it otherwise would have. For rules that can be carried out on the NID 2, the offload driver 26 generates a command 39 to the NID 2. This command 39 is carried in a packet that is communicated across the PCIe bus. This command 39 is understandable by the NID 2. The command 39 instructs the NID 2 to load lookup information into a flow table or flow tables on the NID 2. When the flow table or flow tables are loaded in this way, the NID 2 then implements the OvS rules.

Ordinarily an OvS switch subsystem on the host would implement an OvS rule. For example, a rule might be put in place to cause a flow of packets received onto the NID to be supplied to the VIRTIO device #1. In the conventional OvS switch subsystem, all packets received onto the NID would typically be forwarded across the PCIe bus to the host computer. The OvS system on the host computer would then analyze each packet to determine if it matches a rule. Packets of the flow in this example would match the rule, and the action of the rule would indicate that the packet should be forwarded to VIRTIO device #1. Accordingly, the host computer would perform the packet switching function and would forward the packets to VIRTIO device #1. In contrast to this, in the system 1 of FIG. 1, packet switching is done on the NID 2. The Switch subsystem 22 of FIG. 1 maintains the same rule as in the example of the conventional system, and from the perspective of the Switch subsystem 22 it is handling packet switching. In reality, however, the offload driver 26 has detected the rule, and has determined that the action indicated by rule can be carried by the NID 2. The NID 2 was therefore loaded with appropriate lookup information so that the NID could carry out the rule. Each packet coming into the NID 2 is analyzed on the NID 2. Packets for the flow will match the rule as determined by the NID. The action indicated by the rule is to forward the packets of the flow across the PCIe virtual function #1. Packet switching is therefore done on the NID. The packets of the flow pass across the PCIe virtual function #1 and are written into the memory buffers of the receive queue handled by the user mode driver instance #1. The VIRTIO Relay program 23 in turn causes the packets to be read out of these memory buffers and to be written into receive buffers handled by the VIRTIO Device #1. The Switch subsystem 22 takes no part in this relaying of the packets. The Switch subsystem 22, however, maintains statistics (for example, packet counts) for the flow of packets that it is, according to the OvS protocol, supposed to be switching. Unknown to the Switch subsystem 22, the NID 2 handles the switching of the packets and updates the statistics for the flow where that statistics information is stored on the host computer. The NID updates the statistics so that the statistics on the host computer are maintained and accurate as if the packets had been actually handled and switched by the Switch subsystem 22. For additional information on how these statistics and packet counts of the Switch subsystem 22 are updated by the NID, see: U.S. patent application Ser. No. 14/923,457, entitled "Maintaining Bypass Packet Count Values", filed Oct. 27, 2015, by Johann H. Tönsing (the subject matter of which is incorporated herein by reference).

In FIG. 1, the arrow 40 indicates the path of switching rule information 39 (for example, rules) from the Switch subsystem 22 through the offload driver 26 and to the NID 2. Heavy arrow 41 represents the DMA transfer of a first flow of packets that is packet switched on the NID 2 to pass across SR-IOV compliant PCIe virtual function #1. Heavy arrow 42 represents the relaying of these packets of the first flow by the VIRTIO Relay program 23 from memory buffers of the first user mode driver instance 29 and into memory space of VIRTIO device #1. Heavy arrow 43 represents the DMA transfer of a second flow of packets that is packet switched on the NID 2 to pass across SR-IOV compliant PCIe virtual function #2. Heavy arrow 44 represents the relaying of these packets of the second flow by the VIRTIO Relay program 23 from memory buffers of the second user mode driver instance 30 and into memory space of VIRTIO device #2. For packets of the flows represented by arrows 41 and 43 in FIG. 1, the host computer 3 does not do any matching of any packet field (for example, the contents of a packet header) to any packet switching rule in order to make any packet steering decision. The host computer 3 does not analyze the content of any packet header of any one of the packets of these flows in order to determine whether that particular packet should be relayed to VIRTIO device #1 or to VIRTIO device #2. The VIRTIO Relay Program 23 does not maintain or use any packet switching rules or flow tables.

Figure 2:
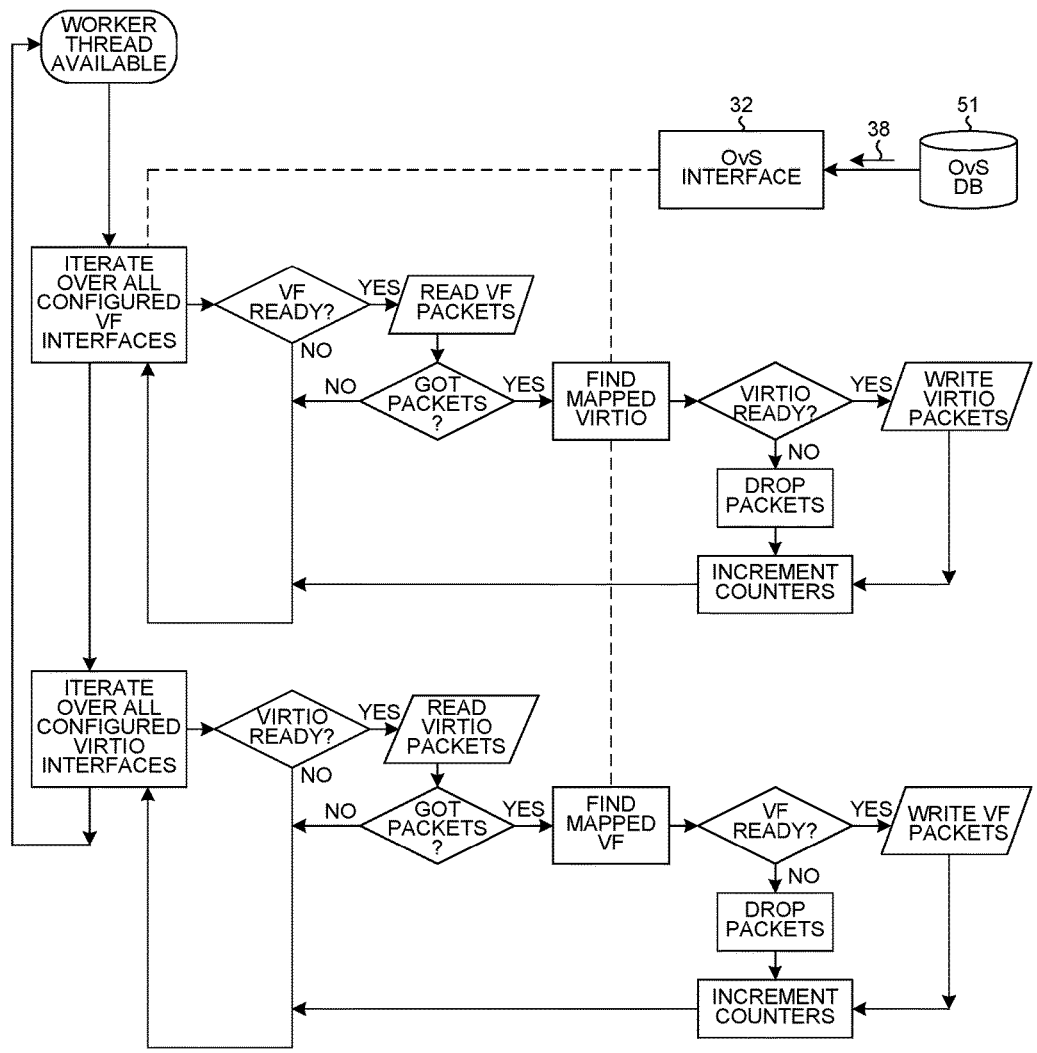
FIG. 2 is a flowchart that illustrates an operation of the VIRTIO Relay Program of FIG. 1.

FIG. 2 is a flowchart that illustrates an operation of the VIRTIO Relay program 23.

Specific Embodiment of the ASCII Text File Appendix: The ASCII text file appendix includes four files: 1) VIRTIO_Relay_Program.txt; 2) Offload_Driver.txt; 3) Control_Message_Driver.txt; 4) Fallback_and_VF_netdev_Drivers.txt. Each of these files is in turn a concatenation of other files. A file whose file name ends in ".c" is a source code program written in the C programming language, and a file whose file name ends in ".h" is a header file. The file "VIRTIO_worker.c" is the main VIRTIO Relay program 23. The file "ovsdb_mon.c" is a program that implements the "OvS DB" block 51 of FIG. 1. The file "nfp_net.c" is a program that implements a user mode driver instance, such as the "first user mode driver instance" 29 or the "second user mode driver instance" 30. The file "VIRTIO_vhostuser.c" is a program that implements a Vhost user interface instance, such as the "Vhost-user interface instance" 33 or the "Vhost-user interface instance" 34.

Although an example is set forth above in which the mapping information used by the Relay Program 23 involves a one-to-one correspondence between SR-IOV compliant PCIe virtual functions and VIRTIO devices, in another example the mapping performed by the Relay Program 23 is not a one-to-one mapping. In one example, one SR-IOV compliant PCIe virtual function is mapped to multiple ones of the VIRTIO devices. A packet coming into the NID 2 is made to be copied such that a copy of the packet gets transferred into memory space of a selected first one of the VIRTIO devices and such that another copy of the same packet also gets transferred into memory space of a selected second one of the VIRTIO devices. The mapping information determines which ones of the VIRTIO devices will be receiving packets in this way. In another example, each of the packets coming into the NID 2 and being passed to the host computer 3 via the single SR-IOV compliant PCIe virtual function is not copied, but rather it is forwarded to a selected one of the VIRTIO devices and then a subsequent packet of the same flow that is received onto the host computer 3 via the same SR-IOV compliant PCIe virtual function is forwarded to another selected one of the VIRTIO devices. Successive packets of the flow being packet switched are therefore distributed by the Relay Program 23 across a selected set of VIRTIO devices. In the same way, packets originating from multiple different VIRTIO devices may all be relayed by the Relay Program 23 so that they pass to the NID 2 via the same one SR-IOV compliant PCIe virtual function. Alternatively, packets originating from a single VIRTIO device may be distributed by the Relay Program 23 so that they then pass, one by one, to the NID 2 across the PCIe bus 4 via a selected set of SR-IOV compliant PCIe virtual functions. Flows of packets that are relayed in this fashion may in turn include subflows of packets. Despite these different types of relaying of packets being carried out by the Relay Program 23, the Relay Program 23 does not analyze the content of any packet header of any one of the packets in order to perform the specified relaying. Alternatively, only very minor examination of a packet is performed in order to determine how that packet should be relayed. Most flows may be relayed without examination of any packet header, where the relaying of a few selected flows may involve a minor type of examination of packet headers. The Relay Program 23 may undertake both types of relaying simultaneously. In addition to the mapping information being received from the OvS switch subsystem 22 as described above, some or all of the mapping information may be preprogrammed into the Relay Program 23 or may be received by the Relay Program 23 from a source other than the OvS switch subsystem 22.

In one example, this minor examination of a packet may involve the following. An n-tuple comprised of a set of header fields (for example, the IP source and destination address, the TCP/UDP source and destination port, and the IP protocol, forming a 5-tuple) is used to identify a subflow. This n-tuple is fed into a mathematical algorithm or function (e.g. a hash function followed by a modulo operation) to assign the subflow to one of a number of destinations, i.e. load balance the subflow to the set of destinations. Importantly, this mathematical algorithm or function does not involve a rule lookup operation. It is faster and involves less computational load on the processor of the host computer as compared to a method involving a rule lookup operation. In one example, the input to this mathematical algorithm is the values of an n-tuple and the output of the mathematical algorithm is an integer in a particular range of integers, where each possible integer corresponds to a possible destination. This mechanism ensures that a subflow is consistently sent to the destination and that packet order is maintained within a subflow. A first such subflow may be relayed by the Relay Program 23 to a first VIRTIO device whereas a second such subflow may be relayed by the Relay Program 23 to a second VIRTIO device. Both of these subflows may come into the Relay Program 23 via the same SR-IOV Compliant PCIe virtual function. Likewise, in the opposite direction, a first subflow may be relayed by the Relay Program 23 across a first SR-IOV Compliant PCIe virtual function whereas a second subflow may be relayed by the Relay Program 23 across a second SR-IOV Compliant PCIe virtual function. Both of these subflows may come into the Relay Program 23 from the same VIRTIO device.

In one example, the Relay Program 23 and the drivers 24 are embodied on and as part of a non-transient computer-readable medium. The Relay Program 23 and drivers 24 provided by a software supplier in this way to an end user of the software. The end user then installs the Relay Program 23 and drivers 24 on the user's system such that the system 1 as is illustrated in FIG. 1 is realized. The non-transient computer-readable medium in this case may, for example, be a combination of magnetic hard disk storage and semiconductor memory storage on a server computer of the software supplier. The end user can then download the Relay Program 23 and the drivers 24 from the server computer via the internet. The Relay Program 23 and drivers 24 can also come pre-installed on the host computer 3 of the end user. The programs 23 and 24 may, for example, have been preloaded and installed by the manufacturer of the host computer 3. In this case, the non-transient computer-readable medium is storage on the host computer 3 such as a combination of hard disk storage and semiconductor memory storage.

Although certain specific embodiments are described above for instructional purposes, the teachings of this patent document have general applicability and are not limited to the specific embodiments described above. If the Input/Output Memory Management Unit (IOMMU) of the host computer 3 allows it and if page faults and mapping issues are handled, then the DMA engine 21 of NID 2 can write directly into memory space of a virtual machine (either VM#1 or VM#2 in this example) in one and only one write operation. There are reasons for performing the transfer in one write operation, and there are reasons for performing the transfer in two write operations. Which is more desirable, if both are possible, may depend on the application and architecture of the host computer employed. Accordingly, various modifications, adaptations, and combinations of various features of the described embodiments can be practiced without departing from the scope of the invention as set forth in the claims.

What is claimed is:

1. In a system that includes a Network Interface Device (NID) and a host computer, wherein the NID is coupled to the host computer via a Peripheral Component Interconnect Express (PCIe) bus, wherein the host computer has an operating system and a plurality of Virtual Machines (VMs), wherein the operating system has a kernel, a method comprising:
   (a) executing an Open Virtual Switch (OvS) switch subsystem on the host computer, wherein at least part of the OvS switch subsystem executes in user space;
   (b) executing a PCIe VF-to-VIRTIO device Relay Program (a PCIe Virtual Function to Virtual Input/Output device Relay Program) on the host computer, wherein the Relay Program executes in user space;
   (c) supplying mapping information from the OvS switch subsystem to the Relay Program, wherein the mapping information is PCIe virtual function to Virtual I/O (VIRTIO) device mapping information;
   (d) communicating switching rule information from the OvS switch subsystem to the NID via the PCIe bus;
   (e) receiving a packet onto the NID from a network, wherein the packet is received in (e) at a time;
   (f) based at least in part on packet contents of the packet and the switching rule information deciding on the NID to communicate the packet across the PCIe bus via a selected one of a plurality of Single Root I/O Virtualization (SR-IOV) compliant PCIe virtual functions;
   (g) communicating the packet from the NID and across said selected one of the plurality of SR-IOV compliant PCIe virtual functions to the host computer such that the packet is written into user space memory of an instance of a user mode driver of the Relay Program; and
   (h) using the mapping information on the Relay Program to cause the packet to be transferred from the user space memory of the instance of the user mode driver of the Relay Program to memory space of one of the VMs, wherein the transfer of the packet in (h) is completed at a time, wherein the packet is communicated in (g) and is transferred in (h) without the operating system of the host computer making any steering decision for the packet based on packet contents at any time between the time the packet is received onto the NID in (e) and the time the transfer of the packet in (h) is completed.

2. The method of claim 1, wherein the supplying of the mapping information in (c) involves:
(c1) storing a correspondence in the Relay Program between a PCIe virtual function and a corresponding VIRTIO device;
(c2) receiving a notification from the OvS switch subsystem, wherein the notification indicates one of the SR-IOV compliant PCIe virtual functions to the Relay Program; and
(c3) using the SR-IOV compliant PCIe virtual function that was indicated by the notification of (c2) and the correspondence stored in (c1) to generate the mapping information, wherein the mapping information is a mapping between the SR-IOV compliant PCIe virtual function indicated by the notification and a VIRTIO device.

3. The method of claim 2, wherein the correspondence stored in (c1) is a correspondence between an SR-IOV compliant PCIe virtual function having an instance number and a VIRTIO device having an instance number, wherein the instance number of the SR-IOV compliant PCIe virtual function is the same as the instance number of the VIRTIO device.

4. The method of claim 1, wherein the supplying of the mapping information in (c) involves:
(c1) communicating the mapping information from the OvS switch subsystem to the Relay Program; and
(c2) storing the mapping information so that the Relay Program can access and use the mapping information in determining how to relay a packet.

5. The method of claim 1, wherein the memory space of one of the VMs is a plurality of buffers, wherein each of the buffers has a corresponding descriptor, and where each of the descriptors for each of the plurality buffers is pushed onto a VIRTIO receive used ring of said one of the VMs.

6. The method of claim 1, wherein the packet is communicated in (g) and is transferred in (h) without any portion of the host computer analyzing any packet header of the packet.

7. The method of claim 1, wherein the packet is communicated in (g) and is transferred in (h) without the packet passing through any network stack of the operating system of the host computer.

8. The method of claim 1, wherein the packet is communicated in (g) and is transferred in (h) without the host computer performing any rule-based flow table lookup operation on the packet.

9. The method of claim 1, further comprising:
(i) generating statistics information on the NID, wherein the statistics information pertains to the packet;
(j) transferring the statistics information from the NID and to the host computer; and
(k) using the statistics information on the host computer to update statistics information maintained by the OvS switch subsystem.

10. The method of claim 1, wherein the packet is communicated in (g) and is transferred in (h) in no more than two memory write operations into memory of the host computer.

11. The method of claim 1, wherein the packet is communicated in (g) and is transferred in (h) in two and not more than two memory write operations into memory of the host computer, wherein a first of the two memory write operations is a Direct Memory Access (DMA) write caused by a DMA controller of the NID, and wherein a second of the two memory write operations is a write carried out by a processor of the host computer.

12. The method of claim 1, wherein no part of the Relay Program executes in kernel space of the host computer.

13. The method of claim 1, wherein the Relay Program also handles relaying of packets that pass from the VMs, across the PCIe bus, and to the NID.

14. In a system that includes a Network Interface Device (NID) and a host computer, wherein the NID is coupled to the host computer via a Peripheral Component Interconnect Express (PCIe) bus, wherein the host computer has an operating system and a plurality of Virtual Machines (VMs), a method comprising:
(a) executing a switch subsystem on the host computer, wherein at least part of the switch subsystem executes in user space;
(b) executing a PCIe VF-to-VIRTIO device Relay Program (a PCIe Virtual Function to Virtual Input/Output device Relay Program) on the host computer, wherein the Relay Program executes in user space;
(c) maintaining mapping information usable by the Relay Program, wherein the mapping information is PCIe virtual function to Virtual I/O (VIRTIO) device mapping information;
(d) communicating switching rule information from the switch subsystem to the NID;
(e) receiving a packet onto the NID from a network, wherein the packet is received in (e) at a time;
(f) based at least in part on a packet header of the packet and the switching rule information deciding on the NID to communicate the packet across the PCIe bus via a selected one of a plurality of Single Root I/O Virtualization (SR-IOV) compliant PCIe virtual functions;
(g) communicating the packet from the NID and across said selected one of the plurality of SR-IOV compliant PCIe virtual functions to the host computer such that the packet is written into user space memory of an instance of a user mode driver of the Relay Program; and
(h) using the mapping information on the Relay Program to cause the packet to be transferred from the user space memory of the instance of the user mode driver of the Relay Program to memory space of one of the VMs, wherein the transfer of the packet in (h) is completed at a time, wherein the packet is communicated in (g) and is transferred in (h) without the operating system of the host computer making any steering decision for the packet based on any packet header of the packet at any time between the time the packet is received onto the NID in (e) and the time the transfer of the packet in (h) is completed.

15. The method of claim 14, wherein the switch subsystem includes a control agent portion and an Open Virtual Switch (OvS) portion, wherein the control agent portion sends an OvS Data Base (DB) notification to the Relay Program.

16. The method of claim 14, wherein the NID is a network interface card.

17. The method of claim 14, wherein the mapping information indicates a mapping, and wherein the mapping is an implicit one-to-one mapping.

18. The method of claim 14, wherein the Relay Program also handles relaying packets that pass from the VMs, across the PCIe bus, and to the NID.

19. A non-transient computer-readable medium containing program instructions for causing a computer to perform the method of:

(a) receiving PCIe virtual function to Virtual I/O (VIRTIO) device mapping information (Mapping Information) onto a PCIe VF-to-VIRTIO device Relay Program (a PCIe Virtual Function to Virtual Input/Output device Relay Program) from a switch subsystem, wherein both the Relay Program and the switch subsystem and a plurality of virtual machines execute on a host computer, wherein the Relay Program executes in user space on the host computer; and (b) receiving a packet onto the host computer from a Network Interface Device (NID) via one of a plurality of Single Root I/O Virtualization (SR-IOV) compliant PCIe virtual functions of a PCIe bus and using the Mapping Information to relay the packet so that the packet is written into memory space of a selected one of the plurality of virtual machines, wherein the packet is received in (b) onto the host computer via the PCIe bus at a time, wherein the relaying is performed by the Relay Program, wherein the packet is received onto the host computer and is written into the memory space of the selected virtual machine without any part of the host computer making any steering decision for the packet based on any packet header of the packet at any time between the time the packet is received onto the host computer via the PCIe bus until the packet is written into the memory space.

20. The non-transient computer-readable medium of claim 19, wherein (a) and (b) are performed by the Relay Program, and wherein the non-transient computer-readable medium comprises semiconductor memory of the host computer.

21. The non-transient computer-readable medium of claim 19, wherein the receiving of the packet of (b) involves a writing of the packet into user space memory of an instance of a user mode driver of the Relay Program.

* * * * *